United States Patent
Twork, Sr. et al.

[11] Patent Number: 5,121,894
[45] Date of Patent: Jun. 16, 1992

[54] FUEL FILTER BRACKET

[75] Inventors: Timothy H. Twork, Sr., Mt. Clemens; Joseph L. Janiszewski, Berkley, both of Mich.

[73] Assignee: Industrial Machine Products, Inc., Oxford, Mich.

[21] Appl. No.: 687,068

[22] Filed: Apr. 18, 1991

[51] Int. Cl.⁵ .............................. A47G 1/10
[52] U.S. Cl. .................... 248/316.7; 248/74.2
[58] Field of Search ............ 248/316.7, 316.3, 316.1, 248/544, 74.2; 24/274 R, 284, 329, 331

[56] References Cited

U.S. PATENT DOCUMENTS

| | | | |
|---|---|---|---|
| 1,919,767 | 7/1933 | Bohlman | 248/316.1 |
| 3,163,391 | 12/1964 | Adams | 248/316.7 X |
| 3,216,685 | 11/1965 | Raymond | 248/316.7 X |
| 3,287,690 | 11/1966 | Book | 248/316.7 X |
| 3,313,009 | 4/1967 | Beckerer | 248/74.2 |

Primary Examiner—Ramon O. Ramirez
Attorney, Agent, or Firm—Krass & Young

[57] ABSTRACT

A bracket for mounting a fuel filter on a vehicle without the use of tools or special equipment. The bracket has a base and two arcuate, resilient side walls spaced apart at their distal ends to create an opening. The fuel filter is inserted in the bracket through the opening. Once inserted, the side members embrace and support the filter. Further, a locking slot receives an annular protrusion located on the filter thereby preventing movement of the filter within the bracket.

8 Claims, 2 Drawing Sheets

FUEL FILTER BRACKET

INTRODUCTION

This invention relates to a bracket for mounting a fuel filter on a vehicle. More particularly, the fuel filter may be installed in the bracket without the need for any tools or special equipment.

BACKGROUND OF THE INVENTION

Vehicular fuel systems typically contain a fuel filter connected to a fuel line extending between a fuel tank and a fuel intake. The fuel filter typically comprises an outer shell forming a filter body. The filter body surrounds and contains a filter element. Inlet and outlet ports extend outwardly from the filter body and are connected by fittings to the fuel line. The purpose of the fuel filter is to remove any impurities from the fuel prior to use in an internal combustion engine. Depending upon use, the fuel filter should be replaced at regular intervals in order to maintain peak engine performance.

Typically, a fuel filter is mounted on a vehicle using a strap or band type clamp surrounding the filter body. An operator, using tools or special equipment, either tightens or loosens the clamp during installation and removal of the fuel filter.

Fuel filters are also mounted on a vehicle using a snap-in bracket. A snap-in bracket comprises two sets of oppositely acting fingers which engage and support the inlet and outlet ports of the fuel filter. Snap-in brackets do not support the fuel filter body and as filter size increases, the stress at the body/port connection also increases. The increased stress results in a greater potential for failure of the filter at the body/port connection.

It is the object of the present invention to develop a fuel filter bracket for mounting a fuel filter on a vehicle. The bracket supports the filter body and the filter may be installed and removed without the need for any tools or special equipment.

SUMMARY OF THE INVENTION

Accordingly, the present invention is directed towards a semi-cylindrical spring steel bracket for mounting a cylindrical fuel filter on a vehicle. The bracket is secured to the vehicle and includes arcuate, oppositely acting, side walls which embrace and hold the fuel filter body.

According to a specific embodiment of the invention, the resiliency of the side walls is controlled by slots formed in the side walls; increasing the size of the slots correspondingly increases the resiliency of the side walls. The distal ends of the side walls are spaced apart to create an opening. The filter is installed or removed from the bracket through the opening without the use of any tools or special equipment.

In the illustrated embodiment, the bracket is provided with a locking slot which receives and cooperates with an annular protrusion or ring located on the filter, typically a joint or connection formed during filter manufacture, to prevent the filter from moving longitudinally within the bracket.

Additionally, the side walls include outwardly extending flange portions forming a lead to facilitate fuel filter installation.

Overall, the fuel filter bracket of the present invention provides a quick and effective means to secure and support the body of the fuel filter on a vehicle without the use of any tools or special equipment.

DETAILED DESCRIPTION OF THE ILLUSTRATIVE EMBODIMENT

Figure 1:
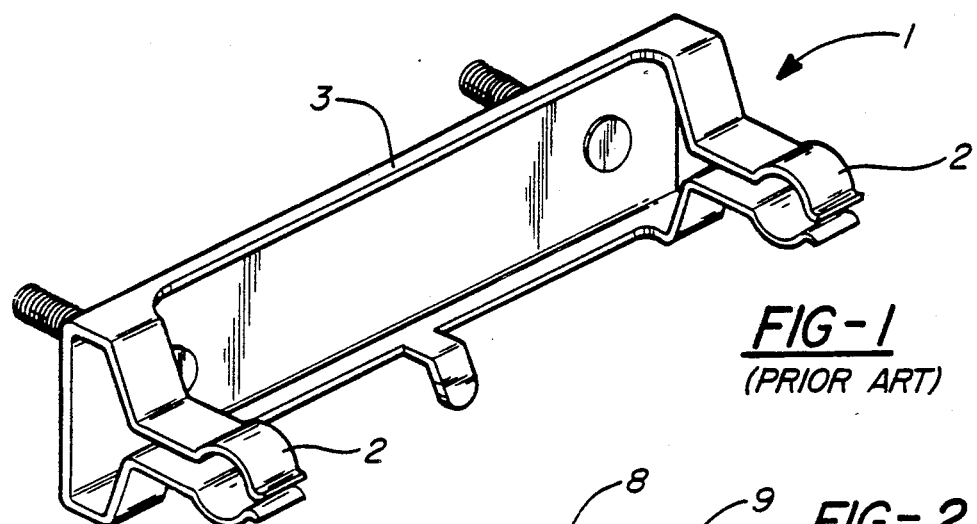
FIG. 1 is a perspective view of a prior art bracket for securing a fuel filter to a vehicle.
Figure 2:
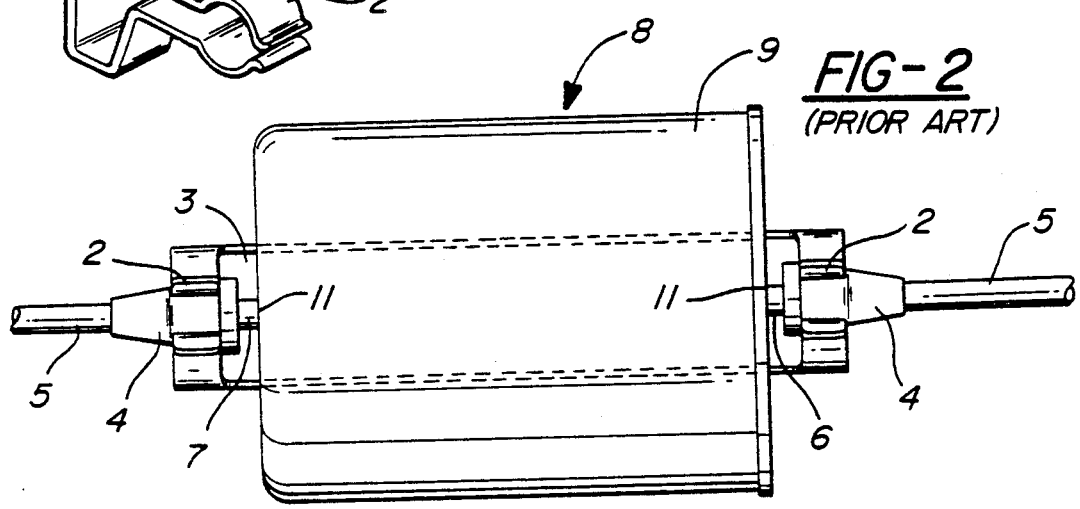
FIG. 2 is a front view of a prior art bracket showing a fuel filter mounted on said bracket.

Referring now to FIGS. 1 and 2, there is shown a prior art bracket 1 for mounting a fuel filter 8 on a vehicle. The bracket comprises spring clips 2 extending outwardly from a base member 3. Each spring clip 2 grasps and holds a fitting 4 used to connect an inlet 6 and outlet 7 port of the fuel filter 8 to the fuel line 5. As shown in FIG. 2 the fittings 4 are attached to the inlet 6 and outlet 7 ports proximate the filter body 9. By connecting the fuel line 5 to the fuel filter 8 proximate the filter body 9 the stress at the body/port interface 11 is reduced.

Development and use of a new quick-connect fitting 40 (see FIG. 5) requires an increase in the space between the fitting 40 and the filter body 9. The increase in space is necessary to allow a fitting release tool (not shown) to be inserted between the filter body 9 and the quick-connect fitting 40. The space between the fitting 40 and the filter body 9 is increased by increasing the length of the inlet 6 and outlet 7 ports. Increasing the port length correspondingly increases the stress at the body/port interface 11 when the filter is supported only at the fittings 40. The increased stress at the body/port interface results in a greater chance of fuel leakage due to filter failure.

Figure 3:
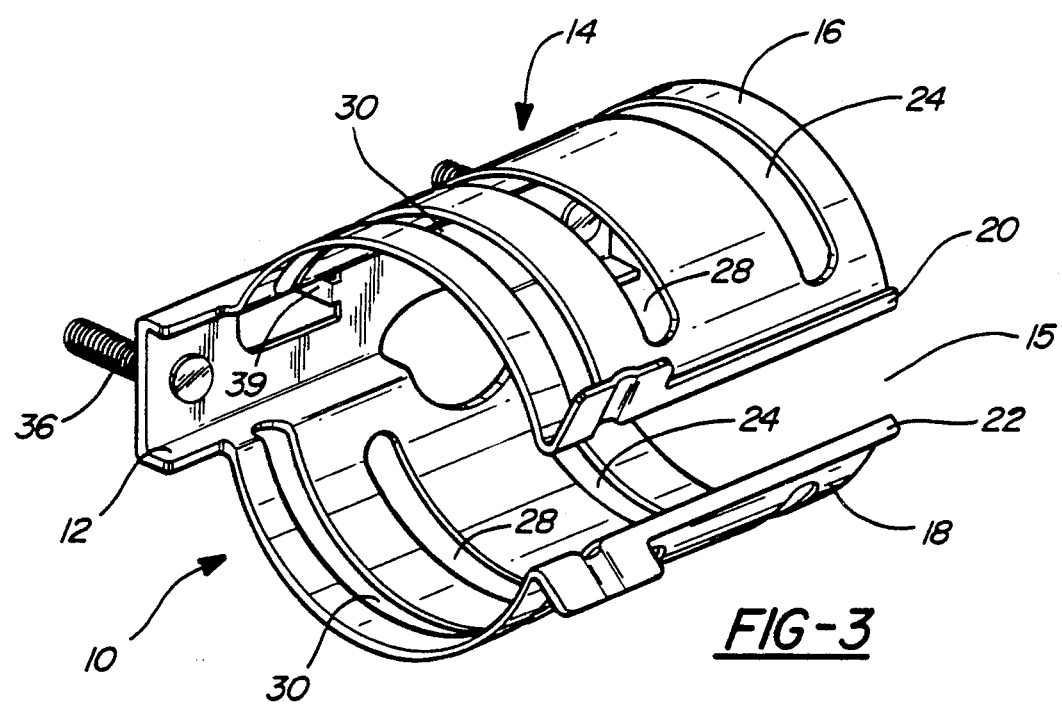
FIG. 3 is a perspective view of a fuel filter bracket according to the present invention.
Figure 4:
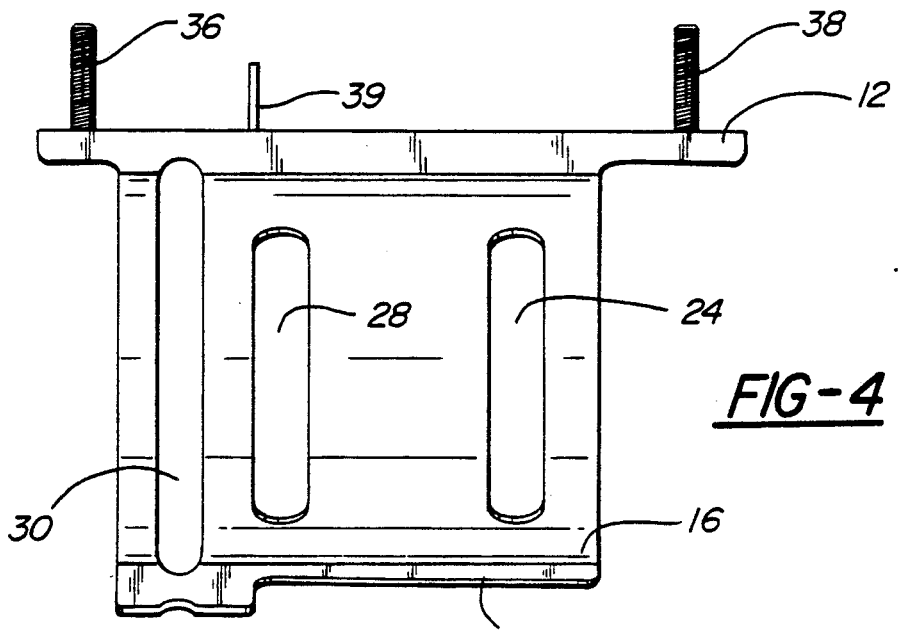
FIG. 4 is a plan view of the fuel filter bracket of the present invention.
Figure 5:
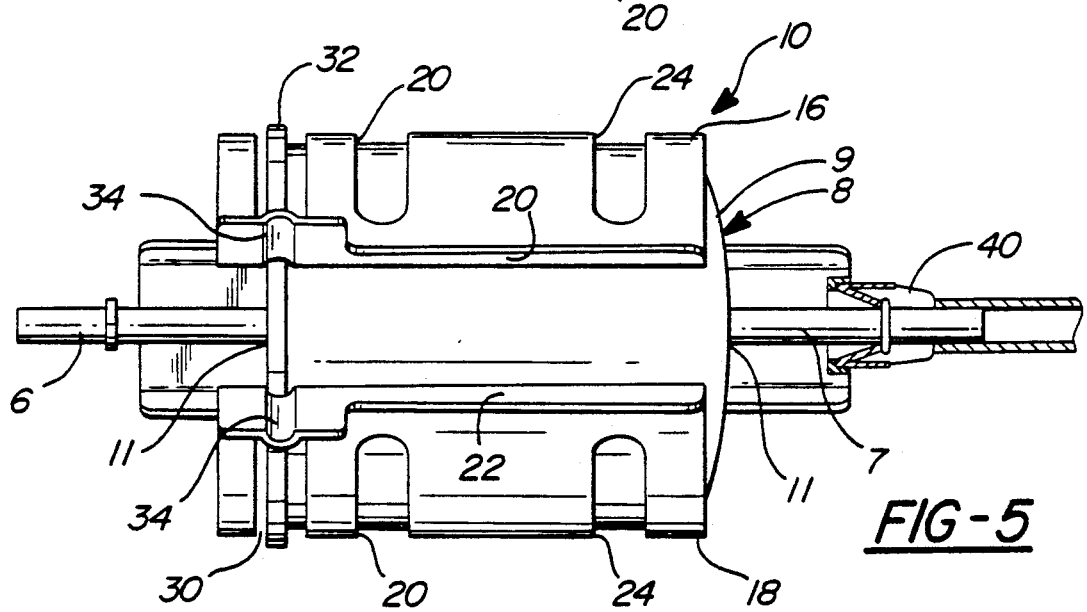
FIG. 5 is a front view of the fuel filter bracket of the present invention showing a fuel filter mounted within said bracket.
Figure 6:
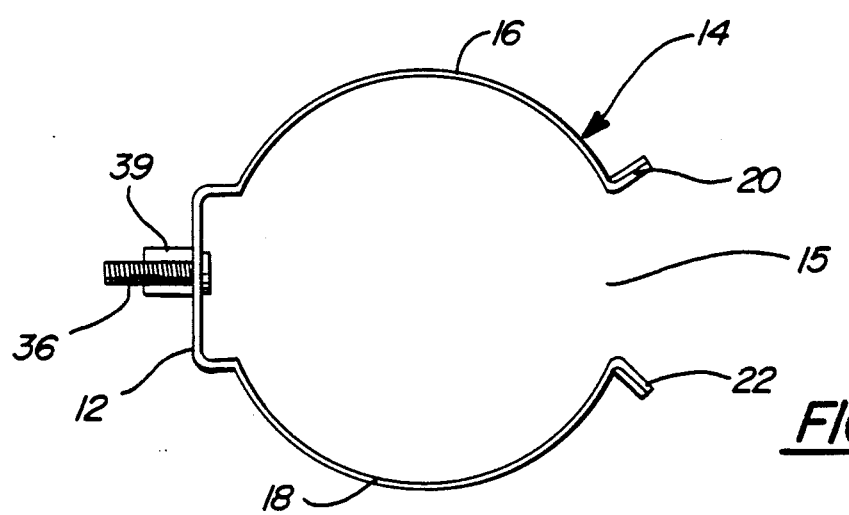
FIG. 6 is an end view of the fuel filter bracket of the present invention.

Turning now to FIGS. 3-5, there is shown an illustrative embodiment of a fuel filter bracket 10 for mounting a fuel filter 8 to a vehicle. Further, installation of the filter 8 in the bracket 10 does not require tools or special equipment. According to the present invention, the bracket 10 comprises a generally U-shaped base portion 12 and a semi-cylindrical housing 14, comprising arcuate side walls 16,18, integral with the base portion 12. The distal ends of the side walls 16,18 are spaced apart to provide an entry/exit opening 15 for insertion and removal of the fuel filter 8.

The bracket 10 is of one piece construction and is formed of 1050 spring steel. After forming, the bracket is hardened and tempered to establish both memory and toughness. To harden, the bracket is heated in a furnace at a temperature of 1500°-1750° F. until completely austentized. Once austentized the bracket is quenched, using either a direct oil quench at a temperature of 110°-130° F. or a hot oil quench maintained at a temperature of 180°-350° F. After quenching, the bracket is tempered in a furnace or liquid bath at 300°-400° F. for approximately one hour. This treatment results in a bracket 10 which during installation and removal of the fuel filter 8 is not flexed beyond its yield point and returns each time to its original shape.

To facilitate installation of the fuel filter 8, the distal ends of the side walls 16,18 are provided with outwardly extending flange portions 20,22 which lead the filter body 9 into the semi-cylindrical housing 14. The filter body 9 cooperates with the flanges 20,22 to urge the side walls 16,18 outward, enabling the filter body 9 to be positioned in the semi-cylindrical housing 14; i.e., between the side walls 16,18.

The outer diameter of the filter body 9 is slightly greater than the inner diameter of the semi-cylindrical housing 14. Once inserted, the filter 8 causes the side walls 16,18 to deflect slightly from their original position, i.e., the position prior to filter installation. This deflection results in the side walls 16,18 exerting a resilient or spring back force to grasp and hold the fuel filter 8 in position. The resilient or spring back force exerted by the side walls 16,18 on the filter body 9 may be varied by varying the difference in the filter body 9 and housing 14 diameters; i.e., decreasing the inner diameter of the housing 14 relative to the outer diameter of the filter body 9 increases the deflection of the side walls 16,18 which increases the spring back force exerted on the filter body 9. The spring-back or resiliency of side walls 16,18 is also controlled by use of slots, 24,28 located in the side walls 16,18. The spring-back or resilient force of the side walls 16,18 varies inversely with the size of the slots 24,28; i.e., the greater the slot size the lower the spring-back force.

In accordance with a further aspect of the invention, a locking slot 30 is formed in each of the side walls 16,18. The locking slot 30 cooperates with an annular bead or protrusion 32 located on the filter body. The annular bead or protrusion is usually formed on the filter 8 during filter manufacture. Inserting the annular bead or protrusion 32 in the locking slot 30 prevents longitudinal movement of the filter 8 within the bracket 10.

Adjacent the slot 30, the surface area of each flange 20,22 is increased, the increased area contains a groove 34. The groove 34,35 receives the annular bead or protrusion 32 of the filter 8 and guides the annular bead or protrusion 32 into the locking slot 30.

In the illustrated form, mounting screws 36,38 are attached to the base portion 12 and are used to attach the bracket 10 to the vehicle. Normally, the filter 8 is installed in the bracket 10 as a subassembly prior to mounting the bracket 10 on the vehicle. To prevent the filter from being installed on the vehicle in the wrong direction; opposite the direction of fuel flow, a locating tab 39 extends from the base portion 12.

Installation of the fuel filter 8 in the bracket 10 is easily accomplished by an individual without the need for any tools or special equipment. The filter is installed through the opening 15 by aligning the annular bead or protrusion 32 with the groove 34 located on the flanges 20,22. Once aligned, the individual manually exerts a force on the filter body 9 causing the side walls 16,18 to outwardly deflect, enabling the filter body to be placed in the semi-cylindrical housing 14. After insertion of the filter body 9 the side walls 16,18 embrace and hold the filter 8 in position. The filter body 9 is held in a spaced relationship with the base portion 12 of the bracket 10 to prevent wear and vibration noise from occurring during vehicle operation. After installation, the inlet 6 and outlet 7 ports of the filter 8 are connected to the fuel line 5 by the quick-connect fittings 40.

As shown, the subject device provides a bracket which permits a standard automotive fuel filter to be supported in the bracket and connected to the fuel line without the need for any tools or special equipment.

Various modifications and additions to the embodiment as described herein may be made without departing from the scope of the invention.

I claim:

1. A bracket for mounting a fuel filter having an enlarged body portion, and an inlet port and an outlet port connected to and extending outwardly from said enlarged body portion comprising:
    a base;
    two arcuate, resilient side walls, having proximal and distal ends, attached to said base and defining a semi-cylindrical housing, said side walls embracing and exerting a resilient force upon the body portion of said filter to grasp and hold the filter;
    said side walls spaced apart at their distal ends to form an opening through which the filter is installed and removed; and
    a flange attached to the distal end of one of said side walls said flange extending outwardly from said housing to form a lead to facilitate filter installation.

2. A bracket according to claim 1 wherein the side walls have slots for varying the resiliency of said side walls.

3. A bracket according to claim 1 including locking means associated with said bracket, said locking means preventing longitudinal movement of said filter within said bracket.

4. An apparatus according to claim 3 wherein said locking means comprises said side walls having a locking slot, said locking slot receiving an annular protrusion located on the filter.

5. A bracket apparatus according to claim 4 wherein said flange has an increased surface area adjacent said locking slot, said increased surface area further including a groove which guides the annular protrusion into the locking slot.

6. An bracket according to claim 1 including a fastener secured to the base.

7. An apparatus according to claim 6 including a locator tab fixed to the base, said tab operative to insure proper orientation of the bracket.

8. A bracket for supporting a filter body comprising:
    a base;
    two arcuate, resilient side walls, having proximal and distal ends, integral with said base and defining a semi-cylindrical housing which embraces and supports said filter body;
    said side walls spaced apart at their distal ends to form an opening through which the filter body is installed and removed from said housing;
    said side walls having slots to vary the resiliency of said side walls;
    said side walls including a locking slot which receive an annular protrusion located on the filter body to prevent movement of the filter body along a longitudinal axis of the bracket; and
    a flange attached to the distal end of each of said side walls, said flange having an increased surface area adjacent said locking slot, said increased area having a groove to guide said annular protrusion into said locking slot.

* * * * *